US012621679B2

(12) United States Patent
Xu et al.

(10) Patent No.: US 12,621,679 B2
(45) Date of Patent: May 5, 2026

(54) USER PLANE DATA PROCESSING METHOD AND BASE STATION

(71) Applicant: CHINA TELECOM CORPORATION LIMITED, Beijing (CN)

(72) Inventors: Sen Xu, Beijing (CN); Zhenqiang Sun, Beijing (CN); Le Zhang, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 849 days.

(21) Appl. No.: 17/923,990

(22) PCT Filed: Apr. 22, 2021

(86) PCT No.: PCT/CN2021/088818
§ 371 (c)(1),
(2) Date: Nov. 8, 2022

(87) PCT Pub. No.: WO2021/244176
PCT Pub. Date: Dec. 9, 2021

(65) Prior Publication Data
US 2023/0180027 A1 Jun. 8, 2023

(30) Foreign Application Priority Data
Jun. 1, 2020 (CN) .......................... 202010484775.6

(51) Int. Cl.
*H04W 24/02* (2009.01)
*H04W 28/06* (2009.01)

(52) U.S. Cl.
CPC ........... *H04W 24/02* (2013.01); *H04W 28/06* (2013.01)

(58) Field of Classification Search
CPC .............................. H04W 24/02; H04W 28/06
See application file for complete search history.

(56) References Cited

U.S. PATENT DOCUMENTS

2016/0255665 A1 9/2016 Futaki
2017/0064768 A1 3/2017 Lee et al.
(Continued)

FOREIGN PATENT DOCUMENTS

CN 105874863 A 8/2016
CN 105992288 10/2016
(Continued)

OTHER PUBLICATIONS

Chinese First Office Action dated Mar. 30, 2024 in Chinese Application No. 202010484775.6 and it's English Translation, 11 pages.
(Continued)

*Primary Examiner* — Faruk Hamza
*Assistant Examiner* — Tito Q Pham
(74) *Attorney, Agent, or Firm* — Andrew M. Calderon; Calderon Safran & Wright P.C.

(57) ABSTRACT

The present disclosure provides a user plane data processing method and a base station. The method includes: each CU-UP determines a current service support capabilities according to first trigger information, and sends it to a CU-CP; the CU-CP selects a CU-UP for each service bearer of the UE according to the current service support capabilities of the each CU-UP if at least part of service bearers of the UE needs to be configured or updated according to second trigger information; the CU-CP sends first UP configuration information associated with the each service bearer to the UE and second UP configuration information associated with the each service bearer to the each CU-UP, thereby the UE determining whether to configure a PDCP status report according to the first UP configuration information, and each CU-UP determining whether to process the PDCP status report from the UE according to the second UP configuration information.

19 Claims, 4 Drawing Sheets

(56) References Cited

U.S. PATENT DOCUMENTS

| | | | |
|---|---|---|---|
| 2018/0049091 A1 | 2/2018 | Wang | |
| 2018/0083688 A1 | 3/2018 | Agiwal et al. | |
| 2018/0139745 A1 | 5/2018 | Xiao et al. | |
| 2019/0132226 A1* | 5/2019 | Zhang | H04W 24/08 |
| 2019/0182660 A1 | 6/2019 | Lee et al. | |
| 2020/0068639 A1* | 2/2020 | Kim | H04W 76/16 |
| 2020/0229049 A1 | 7/2020 | Wu et al. | |
| 2020/0344666 A1 | 10/2020 | Wang et al. | |
| 2020/0367315 A1 | 11/2020 | Gao et al. | |
| 2020/0374961 A1* | 11/2020 | Ingale | H04W 76/20 |
| 2021/0022031 A1 | 1/2021 | Liu et al. | |
| 2021/0092674 A1* | 3/2021 | Hampel | H04W 48/16 |
| 2021/0337461 A1* | 10/2021 | Yang | H04W 48/08 |
| 2021/0399786 A1* | 12/2021 | Agiwal | H04M 3/537 |

FOREIGN PATENT DOCUMENTS

| | | |
|---|---|---|
| CN | 106304399 A | 1/2017 |
| CN | 107222899 | 9/2017 |
| CN | 107950071 | 4/2018 |
| CN | 108541032 A | 9/2018 |
| CN | 108616910 A | 10/2018 |
| CN | 108616995 | 10/2018 |
| CN | 108632229 | 10/2018 |
| CN | 109315001 | 2/2019 |
| CN | 109691155 | 4/2019 |
| CN | 109995553 A | 7/2019 |
| CN | 110035042 | 7/2019 |
| CN | 110062396 A | 7/2019 |
| CN | 110324857 A | 10/2019 |
| CN | 110381535 | 10/2019 |
| WO | 2015139324 A1 | 9/2015 |
| WO | 2018000363 A1 | 4/2018 |

OTHER PUBLICATIONS

Notice of Grant issued on Aug. 2, 2024 in corresponding Chinese Application No. 202010484775.6 with English Translation, 8 pages.
International Search Report and Written Opinion issues in the corresponding Application No. PCT/CN2021/088818 on Jul. 23, 2021; 15 pages.
China Telecom, "Discussion on PDCP Status Report indication over E1 (R3-203134)", 3GPP TSG-RAN WG3 #108-e, May 22, 2020 (cited in the ISR).
3GPP TS 38.401 V15.6.0 (Jul. 2019); 3rd Generation Partnership Project; Technical Specification Group Radio Access Network; NG-RAN; Architecture description (Release 15); 46 pages.
3GPP TS 38.463 V15.7.0 (Jul. 2020); 3rd Generation Partnership Project; Technical Specification Group Radio Access Network; NG-RAN; E1 Application Protocol (E1AP) (Release 15); 179 pages.
3GPP TSG-RAN WG3 #107-e; R3-200169; E-Meeting, Feb. 24-Mar. 6, 2020; 9 pages.

\* cited by examiner

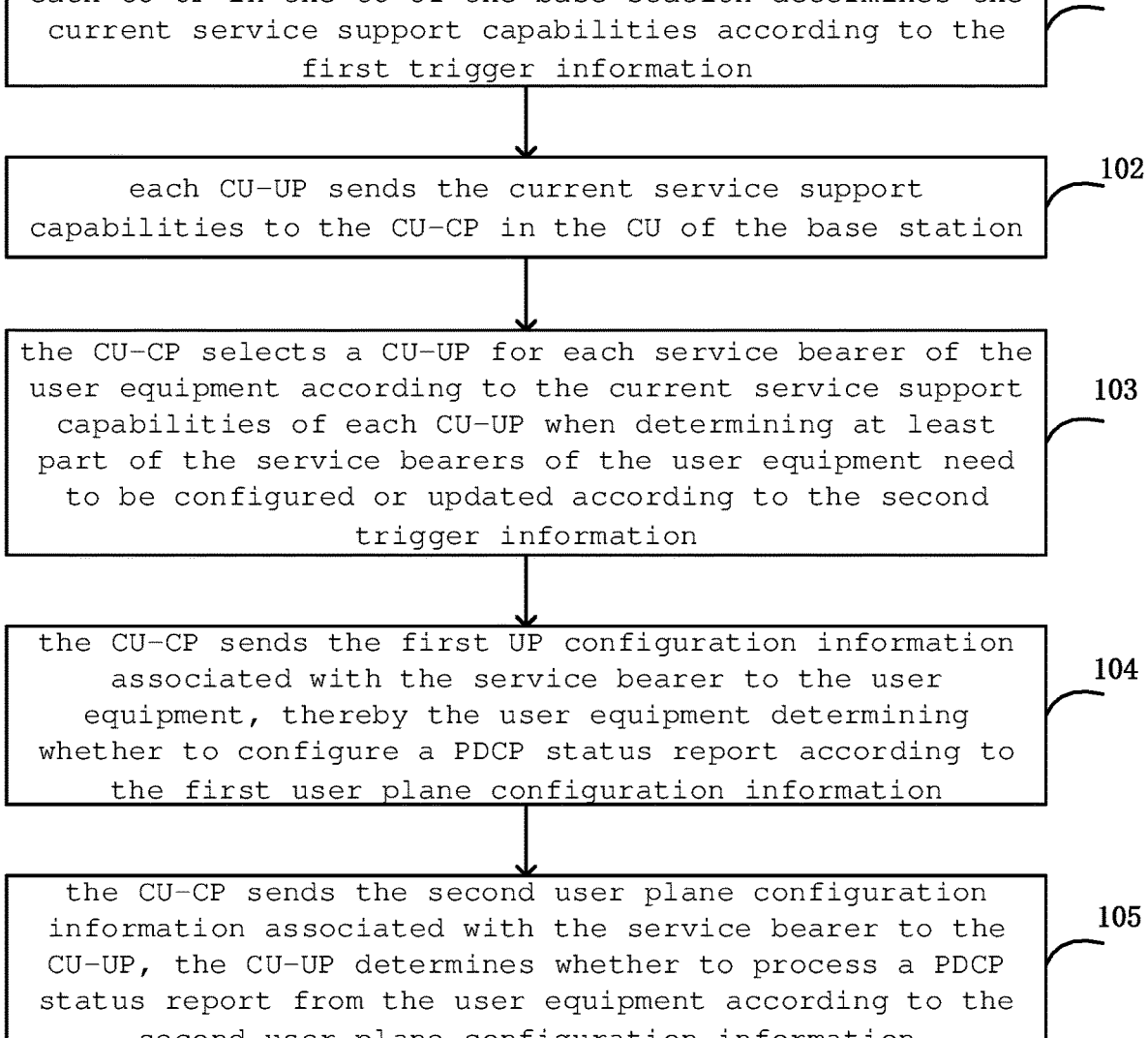

each CU-UP in the CU of the base station determines the
current service support capabilities according to the
first trigger information                                                    101 each CU-UP sends the current service support
capabilities to the CU-CP in the CU of the base station                      102 the CU-CP selects a CU-UP for each service bearer of the
user equipment according to the current service support
capabilities of each CU-UP when determining at least
part of the service bearers of the user equipment need
to be configured or updated according to the second
trigger information                                                          103 the CU-CP sends the first UP configuration information
associated with the service bearer to the user
equipment, thereby the user equipment determining
whether to configure a PDCP status report according to
the first user plane configuration information                               104 the CU-CP sends the second user plane configuration
information associated with the service bearer to the
CU-UP, the CU-UP determines whether to process a PDCP
status report from the user equipment according to the
second user plane configuration information                                  105

FIG. 1

USER PLANE DATA PROCESSING METHOD AND BASE STATION

CROSS-REFERENCE TO RELATED APPLICATIONS

This application is a U.S. National Stage Application under 35 U.S.C. § 371 of International Patent Application No. PCT/CN2021/088818, filed on Apr. 22, 2021, which is based on and claims priority from CN application No. 202010484775.6, filed on Jun. 1, 2020, the disclosure of both of which are hereby incorporated into this disclosure by reference in its entirety.

TECHNICAL FIELD

The present disclosure relates to the field of wireless communications, and in particular, to a user plane data processing method and a base station.

BACKGROUND

As the main technology of the next generation wireless network, 5G has the technical features of supporting ultra-wide band, large connection, and the like. At present, in a wireless network architecture, a base station side adopts an architecture based on a CU (Centralized Unit) and a DU (Distributed Unit). A interface F1 is used between the CU and the DU to transmit information of the control plane and the user plane, wherein the CU is mainly responsible for protocol functions of a PDCP (Packet Data Convergence Protocol), an SDAP (Service Data Adaptation Protocol) and an RRC (Radio Resource Control) layer, and the DU is mainly responsible for functions of a physical layer, an MAC (Media Access Control) layer, an RLC (Radio Link Control) layer, and a part of RRC layer ASN.1 (Abstract Syntax Notation ONE) coding and decoding functions. According to a current protocol, physical layer parameters of the base station are generated and configured by the DU and sent to the CU, a parameter configuration such as a higher layer parameter of a cell and a radio resource management parameter are generated by the CU.

To further support the virtualization function on the base station side, the base station side in the current architecture may include one CP (Control Plane) entity and a plurality of UP (User Plane) entities. The UP entity and the CP entity are connected through an E1 interface. When a UP entity establishes an E1 interface with the CP entity, the UP entity needs to send relevant information to the CP entity to make relevant configuration settings. Currently, only connection capability information of the core network in a protocol is sent to the CP entity. The base station side needs to support various capability information, including capabilities of RoHC (Robust Header Compression) and EHC (Ethernet Header Compression), etc. Limited by base station capabilities, not every UP entity can support all or part of the above capabilities.

According to the current protocol, the base station configures the PDCP parameter information for the UE (user equipment) according to the granularity of a DRB (Data Resource Bearer). For example, under a condition that an RLC entity adopts AM (Acknowledged Mode), it is required to configure whether or not to activate a status report. The status report is mainly used for selective retransmission in the switching process, selective transmission of multi-channel data in double connection and the like. If the status report is configured for the PDCP layer, the PDCP entity of the receiving side triggers a status report procedure to the transmitting side during a reconstruction of the PDCP layer or data recovery of the PDCP. After receiving the status report, the base station regards all SDUs (Service Data Unit) with the value of 1 and less than the value in the FMC (Fixed Mobile Convergence) in the bitmap of the status report as successfully sent, and if the timer is overtime or missing SDUs are acknowledged in the status report, the transmitting end determines that the PDCP SDUs and corresponding PDCP PDUs (Protocol Data Units) need to be discarded. When the PDU has been transmitted to the bottom layer, the PDCP needs to notify the bottom layer to delete corresponding data operations.

Ethernet header compression is an enhancement means for uRLLC (Ultra-reliable and Low Latency Communication) service, and the main purpose of the Ethernet header compression is to save transmission Latency of data packets in air interfaces and improve the overall occupation ratio of payload in the packet transmission process.

SUMMARY

According to a first aspect of the embodiments of the present disclosure, there is provided processing method of user plane data by abase station, comprising: determining, by each user plane entity of a centralized unit (CU-UP) of the base station, a current service support capabilities according to first trigger information; sending, by the each CU-UP entity, the current service support capabilities to a control plane entity of a centralized unit (CU-CP) of the base station; selecting, by the CU-CP entity, a corresponding CU-UP entity for each service bearer of the user equipment according to the current service support capabilities of the each CU-UP entity under a condition that at least part of service bearers of the user equipment needs to be configured or updated according to second trigger information; sending, by the CU-CP entity, first user plane configuration information associated with the each service bearer to the user equipment and second user plane configuration information associated with the each service bearer to the each CU-UP entity, thereby the user equipment determining whether to configure a packet data convergence protocol (PDCP) status report according to the first user plane configuration information, and each CU-UP entity determining whether to process the PDCP status report from the user equipment according to the second user plane configuration information.

In some embodiments, the first trigger information comprises: a first trigger request sent by a network administrator for triggering the each CU-UP entity to send a first interface setup request to the CU-CP entity, or a second trigger request sent by the network administrator for triggering the each CU-UP entity to send a first configuration update request to the CU-CP entity, or a second interface setup request or a second configuration update request sent by the CU-CP entity.

In some embodiments, the current service support capabilities of the each CU-UP entity includes at least one of robust header compression capability support information and Ethernet header compression capability support information, wherein the robust header compression capability support information comprises at least one of supported uplink unidirectional header compression and bidirectional compression, and a list of supported compression algorithms, and the Ethernet header compression capability support information comprises a maximum number of supported context identifiers, compression algorithms, and a feedback mode.

In some embodiments, the sending, by the each CU-UP entity, the current service support capabilities to the CU-CP entity comprises: determining, by the each CU-UP entity, a first bearer message according to the first trigger information; sending, by the each CU-UP entity, the current service support capabilities to the CU-CP entity by using the first bearer message; updating, by the CU-CP entity, the current service support capabilities of the each CU-UP entity after receiving the current service support capabilities sent by the each CU-UP entity, wherein the first bearer message is a first interface setup request under a condition that the first trigger information is the first trigger request; the first bearer message is the second configuration update request under a condition that the first trigger information is the second trigger request; the first bearer message is an interface setup response under a condition that the first trigger information is the second interface setup request; the first bearer message is a configuration update request response under a condition that the first trigger information is the second configuration update request.

In some embodiments, the second trigger information comprises at least one of: a handover request associated with the user equipment sent by a neighboring base station, a bearer setup request or a bearer modification request sent by a core network, and that the user equipment needs to trigger a re-establishment as detected by the CU-CP entity.

In some embodiments, the sending, by the CU-CP entity, the first user plane configuration information to the user equipment comprises: determining, by the CU-CP entity, PDCP configuration information of the each service bearer according to pre-configuration information and the service bearer information of the user equipment; sending, by the CU-CP entity, the first user plane configuration information to the user equipment through a radio resource control reconfiguration message, wherein the first user plane configuration information comprises protocol stack parameter configuration information associated with the PDCP configuration information.

In some embodiments, the determining, by the CU-CP entity, the PDCP configuration information of the each service bearer comprises: determining, by the CU-CP entity, that the PDCP configuration information is not configured with a PDCP status report under a condition that the service bearer needs to be configured with an acknowledged mode and the user equipment does not have handover demand; determining, by the CU-CP entity, that the PDCP configuration information is configured with a PDCP status report under a condition that the service bearer needs to be configured with an acknowledged mode and the user equipment has a handover demand; determining, by the CU-CP entity, whether to configure at least one of a robust header compression mode and an Ethernet header compression mode in the PDCP configuration information according to the pre-configuration information under a condition that the service bearer does not need to configured with a acknowledged mode.

In some embodiments, the pre-configuration information comprises at least one of: a service type of configuring a robust header compression, a service type of configuring a Ethernet header compression, a service type of simultaneously activating the Ethernet header compression and the robust header compression, and information about whether to trigger the status report.

In some embodiments, the sending, by the CU-CP entity, the second user plane configuration information to the each CU-UP entity comprises: determining, by the CU-CP entity, a second bearer message according to the second trigger information after receiving a radio resource control reconfiguration completion message sent by the user equipment; sending, by the CU-CP entity, the second user plane configuration information to the each CU-UP entity using the second bearer message, wherein the second user plane configuration information comprises at least one of a activation indication of the PDCP status report, the robust header compression configuration information, an Ethernet header compression configuration feedback mechanism information and the Ethernet header compression configuration information; processing, by the each CU-UP entity, PDCP data corresponding to a bearer of the user equipment according to the second user plane configuration information after receiving the second user plane configuration information sent by the control plane entity, wherein the second bearer message is a bearer context setup request under a condition that the second trigger information is a bearer setup request sent by a core network or a handover request sent by a neighboring base station; the second bearer message is a bearer context modification request under a condition that the second trigger information is a bearer modification request sent by the core network.

In some embodiments, the processing, by the each CU-UP entity, PDCP data corresponding to a bearer of the user equipment according to the second user plane configuration information comprises: no processing, by the each CU-UP entity, the PDCP status report of the user equipment and discarding a PDCP service data unit according to a discard timer under a condition that the activation indication of the status report of a designated bearer is false or not configured, and deleting the PDCP service data unit from a buffer under a condition that the transmission of the PDCP service data unit is confirmed to be successful according to acknowledgement indication information of the PDCP protocol data unit sent by the CU-CP entity.

In some embodiments, the processing, by the each CU-UP entity, the PDCP data corresponding to the bearer of the user equipment according to the second user plane configuration information comprises: determining, by the each CU-UP entity, whether to discard the PDCP service data unit according to the PDCP status report of the user equipment and the discard timer under a condition that the activation indication of the status report of the designated bearer is true, and deleting the PDCP service data unit from a buffer under a condition that the transmission of the PDCP service data unit is confirmed to be successful according to acknowledgement indication information of the PDCP protocol data unit sent by the CU-CP entity.

In some embodiments, the processing, by the each CU-UP entity, the PDCP data corresponding to the bearer of the user equipment according to the second user plane configuration information further comprises: determining, by the each CU-UP entity, a PDCP service data unit to be retransmitted and a PDCP service data unit which has been correctly received according to whether a PDCP status report is triggered, generating reception status information of the PDCP service data unit, and sending the bearer configuration and data forwarding information to the CU-CP entity through third bearer information corresponding to the second bearer information, under a condition that the second user plane configuration information indicates that the designated bearer triggers a PDCP re-establishment or a PDCP data recovery information unit.

In some embodiments, the third bearer information is a bearer context setup response under a condition that the second bearer information is a bearer context setup request; and the third bearer message is a bearer context modification response under a condition that the second bearer information is a bearer context modification request.

In some embodiments, the processing, by the each CU-UP entity, the PDCP data corresponding to the bearer of the user equipment according to the second user plane configuration information further comprises: feedbacking, by the each CU-UP entity, compression mode indication information not through the PDCP control protocol data unit in a case where uncompressed data packets sent by the user equipment are received in the process of performing compression in the uplink direction, under a condition that the designated bearer is configured with the Ethernet header compression information but is not configured with the Ethernet header compression feedback mechanism, or under a condition that the designated bearer is configured with the Ethernet header compression information and the Ethernet header compression feedback mechanism information indicates false.

In some embodiments, the processing, by the each CU-UP entity, the PDCP data corresponding to the bearer of the user equipment according to the second user plane configuration information further comprises: continuously sending, by the each CU-UP entity, a preset number of uncompressed data packets firstly and then sending subsequent data in a compression mode in a process of performing data processing in the downlink direction, under a condition that the designated bearer is configured with Ethernet header compression information but is not configured with Ethernet header compression feedback mechanism, or under a condition that the designated bearer is configured with Ethernet header compression information and the Ethernet header compression feedback mechanism information indicates false.

In some embodiments, the processing, by the each CU-UP entity, the PDCP data corresponding to the bearer of the user equipment according to the second user plane configuration information further comprises: sending, by the each CU-UP entity, feedback acknowledgement information through the PDCP control protocol data unit in a case where uncompressed data packets sent by the user equipment are received in the process of performing compression in the uplink direction, under a condition that the designated bearer is configured with Ethernet header compression information and the Ethernet header compression feedback mechanism information indicates true.

In some embodiments, the processing, by the each CU-UP entity, the PDCP data corresponding to the bearer of the user equipment according to the second user plane configuration information further comprises: sending, by the each CU-UP entity, a preset number of uncompressed data packets firstly, and then sending compressed data packets to the user equipment according to the Ethernet header compression configuration information after receiving acknowledgement information of the PDCP control protocol data unit fed back by the user equipment in the process of performing data processing in the downlink direction, under a condition that the designated bearer is configured with the Ethernet header compression information and the Ethernet packet header compression feedback mechanism information indicates true.

In some embodiments, the processing, by the each CU-UP entity, the PDCP data corresponding to the bearer of the user equipment according to the second user plane configuration information further comprises: compressing, by the each CU-UP entity, data packets in an Ethernet header compression mode in the uplink direction and the downlink direction under a condition that the designated bearer is configured with Ethernet header compression information and robust header compression information simultaneously.

According to a second aspect of the embodiments of the present disclosure, there is provided a base station, a processor; and a memory coupled to the processor, storing program instructions which, when executed by the processor, cause the processor to implement any of the embodiments described above.

According to a third aspect of the embodiments of the present disclosure, there is provided a non-transitory computer-readable storage medium which stores computer instructions that, when executed by a processor, implement the method according to any of the embodiments described above.

Other features of the present disclosure and advantages thereof will be described clearly from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description taken in conjunction with the accompanying drawings, in which:

FIG. 1 is a schematic flow diagram of a user plane data processing method according to one embodiment of the present disclosure;

It should be understood that the dimensions of the various parts shown in the drawings are not drawn to scale. Further, the same or similar reference numerals denote the same or similar components.

DETAILED DESCRIPTION

Figure 2:
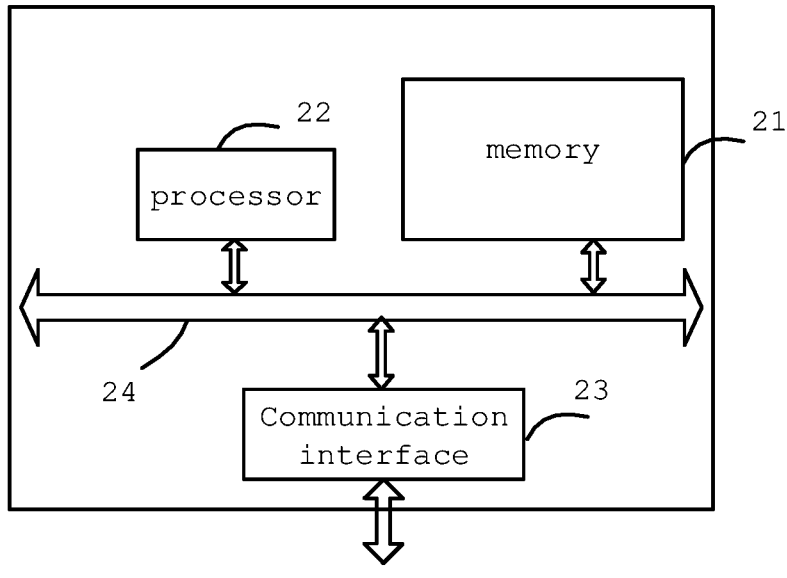
FIG. 2 is a schematic structural diagram of a base station according to one embodiment of the present disclosure.

Various exemplary embodiments of the present disclosure will be described in detail with reference to the accompanying drawings. The description of the exemplary embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that: the relative arrangement of parts and steps, the composition of materials and values set forth in these embodiments are to be construed as illustrative only and not as limiting unless otherwise specifically stated.

The use of "including" or "comprising" and the like in this disclosure is intended to mean that the elements preceding the word encompass the elements listed after the word and does not exclude the possibility that other elements may also be encompassed.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly defined as such herein.

Techniques, methods, and apparatus known to one of ordinary skill in the relevant art may not be discussed in detail but are intended to be part of the specification where appropriate.

The inventors have noticed that under a condition that the 5G base station adopts a structure in which the CP entity and the UP entity are separated, in order to effectively support different types of services and reduce manual configuration and manual participation, the following problems still exist in the current standards:

The CU-CP (centralized unit-control plane entity) cannot determine the type of service supported by CU-UP (centralized unit-user plane entity): the current standards only support transmission of the core network access capability of the user plane during E1 establishment, but capabilities such as RoHC and EHC are not supported. Considering that certain difference exists among some CU-UPS in terms of software functions and deployment scenes, the capability condition of each CU-UP can only be configured manually on the CU-CP at present, in which mode it is always necessary to make manual adjustment at the CU-UP side after the initial configuration and software update of the CU-UP, which increases the configuration workload of an operator and the probability of errors.

There is a difference in the use of the PDCP status report between the user equipment and the CU-CP, which increases the latency at the UP, causes unnecessary data packet retransmission, and reduces the performance of an air interface: at present, whether the PDCP status report is enabled is not transferred in the E1 interface message, but the PDCP status report needs to be configured for the user equipment in the air interface control plane protocol. Based on the current protocol, the manner of sending data packets in the AM mode is different between the transmitting end and the receiving end, which causes the UP entity to increase the retransmission latency of data packets during handover or data recovery because of waiting for the feedback of the status report, and causes the waste of air interface resources due to the retransmission of already acknowledged data packets during the handover process.

The feedback mode of the EHC cannot be specified: currently, it is impossible to configure a feedback mode for each DRB. In the uplink compression process, when the CU-UP serves as a decompressor, it cannot be determined what kind of feedback information is to be used to instruct the user equipment to perform compression training, such that the EHC cannot be applied in an architecture where the CU and UPs are separated.

Based on the above analysis of demands and reasons, the current 3GPP (3rd Generation Partnership Project) NR (New Radio) protocol cannot meet the transmission configuration requirements of various types of services, which may cause problems of data packet loss and poor transmission performance caused by adopting a transmission path with poor performance. Therefore, the protocol and implementation enhancement need to be performed to meet the requirements of future network deployment and optimization.

To this end, the present disclosure provides a user plane data processing scheme to solve at least one of the problems described above.

FIG. 1 is a schematic flow diagram of a user plane data processing method according to one embodiment of the present disclosure. In some embodiments, the following user plane data processing method is performed by a base station.

In step 101, each CU-UP in the CU of the base station determines current service support capabilities according to the first trigger information.

In some embodiments, the first trigger information includes at least one of:
a first trigger request sent by a network administrator for triggering the CU-UP to send a first interface setup request (e.g., gNB-CU-UP E1 Setup Request) to the CU-CP;
a second trigger request sent by the network administrator for triggering the CU-UP to send a first configuration update request (e.g. gNB-CU-UP Configuration Update) to the CU-CP;
a second interface setup request (e.g. gNB-CU-CP E1 Setup Request) sent by the CU-CP;
a second configuration update request (e.g. gNB-CU-CP Configuration Update) sent by the CU-CP.

In some embodiments, the current service support capabilities of the CU-UP includes at least one of RoHC capability support information or EHC capability support information. The RoHC capability support information includes at least one of supported uplink unidirectional header compression or bidirectional compression, and a list of supported compression algorithms, and the EHC capability support information includes a maximum number of supported context identifiers, compression algorithms, and a feedback mode.

In step 102, the each CU-UP sends the current service support capabilities to the CU-CP of the base station CU.

In some embodiments, the CU-UP determines a corresponding first bearer message according to the first trigger information, and sends the current service support capabilities to the CU-CP using the first bearer message.

For example, under a condition that the first trigger information is a first trigger request, the first bearer message is a first interface setup request (gNB-CU-UP E1 Setup Request). Under a condition that the first trigger information is a second trigger request, the first bearer message is a second configuration update request (gNB-CU-UP Configuration Update). Under a condition that the first trigger information is a second interface setup request, the first bearer message is an interface setup response (gNB-CU-CP E1 Setup Response). Under a condition that the first trigger information is a second configuration update request, the first bearer message is a configuration update request response (gNB-CU-CP Configuration Update).

In some embodiments, the CU-CP updates the current service support capabilities of each CU-UP upon receiving the current service support capabilities sent by each CU-UP.

In step 103, the CU-CP selects a CU-UP for each service bearer of the user equipment according to the current service support capabilities of each CU-UP under a condition that it is determined that at least part of the service bearers of the user equipment need to be configured or updated according to the second trigger information.

In some embodiments, the second trigger information comprises at least one of:

a handover request associated with a user equipment sent by a neighboring base station;

a bearer setup or bearer modification request sent by the core network;

the user equipment needs to trigger re-establishment as detected by the CU-UP.

In some embodiments, the CU-CP determines configuration information of service bearers of the user equipment carried by each CU-UP based on the bearer information of the user equipment and the current service support capabilities of each CU-UP.

For example, the configuration information includes:

bearer identifier: PDU session identifier or E-RAB (Evolved Radio Access Bearer) identifier QoS (Quality of Service) configuration of the bearer: under a condition that the bearer identifier adopts the PDU session identifier, it includes QoS Flow Identifier, QoS Flow Level QoS Parameters and QoS Flow Mapping Indication, and under a condition that the bearer identifier adopts the E-RAB identifier, it includes QCI (QoS Class Identifier), E-UTRAN Allocation and Retention Priority and GBR (Guaranteed Bit Rate) QoS Information (QoS Information of GBR).

In step 104, the CU-CP sends first user plane configuration information associated with the service bearer to the user equipment, such that the user equipment determines whether to configure the PDCP status report according to the first user plane configuration information.

In some embodiments, the CU-CP sends the first user plane configuration information to the user equipment comprises: the CU-CP determines the PDCP configuration information of each service bearer according to the pre-configuration information and the service bearer information of the user equipment. The CU-CP sends the first user plane configuration information to the user equipment through an RRC reconfiguration message, wherein the first user plane configuration information comprises protocol stack parameter configuration information associated with the PDCP configuration information.

For example, the pre-configured information includes at least one of:

service type for configuring RoHC: packet service such as voice and low-latency service service type for configuring EHC: packet service such as low-latency service service type for activating EHC and RoHC simultaneously: packet service such as low-latency service whether to trigger status report information: such as bearer and usage scenario information associated with an Acknowledged (AM) mode.

In some embodiments, the CU-CP determines not to configure the PDCP status report in the PDCP configuration information under a condition that the service bearer needs to configure the acknowledged mode and the user equipment does not have a handover need. Under a condition that the service bearer needs to configure an acknowledged mode and the user equipment has a handover need, the CU-CP determines to configure a PDCP status report in the PDCP configuration information. And under a condition that the service bearer does not need to configure the acknowledged mode, the CU-CP determines whether at least one of the RoHC mode and the EHC mode is to be configured in the PDCP configuration information according to the pre-configuration information.

In step 105, the CU-CP sends second user plane configuration information associated with the service bearer to each CU-UP, and each CU-UP determines whether to process a PDCP status report from the user equipment according to the second user plane configuration information.

In some embodiments, the CU-CP sends the second user plane configuration information to the corresponding CU-UP includes: after receiving the RRC reconfiguration complete message sent by the user equipment, the CU-CP determines a corresponding second bearer message according to the second trigger information.

For example, under a condition that the second trigger information is a bearer setup request sent by the core network or a handover request sent by a neighboring base station, the second bearer message is a Bearer Context Setup Request. Under a condition that the second trigger information is a bearer modification request sent by the core network, the second bearer message is a Bearer Context Modification Request.

And then, the CU-CP sends the second user plane configuration information to the corresponding CU-UP by using the second bearer message. The second user plane configuration information comprises at least one of:

PDCP status report activation indication: if the Boolean value is "true", the CU-UP determines that the bearer needs to configure a status report for the bearer in the AM mode, and if the Boolean value is "false" or not configured, the CU-UP determines that the bearer does not need to configure a status report for the bearer in the AM mode;

RoHC configuration information: e.g. RoHC parameters including RoHC type (bidirectional RoHC or unidirectional Uplink only RoHC), maxCID, RoHC Profiles and Continue RoHC;

EHC configuration feedback mechanism information: if the Boolean value is a "true" value, it indicates that the CU-UP needs to feedback a compression feedback result through a PDCP control PDU when serving as a decompression side, and needs to determine the subsequent feedback mode according to the feedback at the decompression side when serving as a compression side, and if the Boolean value is "false", it indicates that the CU-UP does not need to provide a feedback packet and receives and transmits subsequent compression packets based on feedback information;

EHC configuration information: the max CID, the Continue EHC and the Padding Removal valid for both uplink and downlink are included in the uplink and downlink directions, respectively.

In some embodiments, the CU-UP processes the PDCP data corresponding to a bear of the user equipment according to the second user plane configuration information comprises: the CU-UP does not process the PDCP status report of the user equipment and discarding a PDCP SDU according to a discard timer under a condition that the activation indication of the status report of a designated bearer is false or not configured. The CU-UP deletes the PDCP SDU from a buffer under a condition that the transmission of the PDCP SDU is confirmed to be successful according to acknowledgement indication information of the PDCP PDU sent by the CU-CP.

In addition, the CU-UP determines whether to discard the PDCP SDU according to the PDCP status report of the user equipment and the discard timer under a condition that the activation indication of the status report of the designated bearer is true. The CU-UP deletes the PDCP SDU from a buffer under a condition that the transmission of the PDCP SDU is confirmed to be successful according to acknowledgement indication information of the PDCP PDU sent by the CU-CP.

In some embodiments, the CU-UP processes the PDCP data corresponding to the bear of the user equipment according to the second user plane configuration information further comprises: under a condition that the second user plane configuration information indicates that the designated bearer triggers a PDCP re-establishment or a PDCP data recovery information unit (PDCP Data Recovery IE), the CU-UP determines a PDCP SDU to be retransmitted and a PDCP SDU which has been correctly received according to whether a PDCP status report is triggered, generates reception status information of the PDCP SDU, and sends the bearer configuration and data forwarding information to the CU-CP through third bearer information corresponding to the second bearer information.

In some embodiments, under a condition that the second bearer information is a Bearer Context Setup Request, the third bearer information is a Bearer Context Setup response. Under a condition that the second bearer information is a Bearer Context Modification Request, the third bearer information is a Bearer Context Modification Response.

In some embodiments, the CU-UP processes the PDCP data corresponding to the bear of the user equipment according to the second user plane configuration information further comprises: under a condition that the designated bearer is configured with the EHC information but is not configured with the EHC feedback mechanism, or under a condition that the designated bearer is configured with the EHC information and the EHC feedback mechanism information indicates false, the CU-UP does not feedback the compression mode indication information through the PDCP control PDU in a case where uncompressed data packets sent by the user equipment are received in the process of performing compression in the uplink direction.

In some embodiments, the CU-UP processes the PDCP data corresponding to the bear of the user equipment according to the second user plane configuration information further comprises: under a condition that the designated bearer is configured with EHC information but is not configured with EHC feedback mechanism, or under a condition that the designated bearer is configured with EHC information and the Ethernet header compression feedback mechanism information indicates false, the CU-UP first sends a preset number of uncompressed data packets continuously, and then sends subsequent data in a compression mode in a process of performing data processing in the downlink direction.

In some embodiments, the CU-UP processes the PDCP data corresponding to the bear of the user equipment according to the second user plane configuration information further comprises: under a condition that the designated bearer is configured with EHC information and the EHC feedback mechanism information indicates true, the CU-UP sends feedback acknowledgement information through the PDCP control PDU in a case where uncompressed data packets sent by the user equipment are received in the process of performing compression in the uplink direction.

In some embodiments, the CU-UP processes the PDCP data corresponding to the bear of the user equipment according to the second user plane configuration information further comprises: under a condition that the designated bearer is configured with the EHC information and the EHC feedback mechanism information indicates true, the CU-UP sends a preset number of uncompressed data packets firstly, and then sends compressed data packets to the user equipment according to the EHC configuration information after receiving acknowledgement information of the PDCP control PDU fed back by the user equipment in the process of performing data processing in the downlink direction.

In some embodiments, the CU-UP processes the PDCP data corresponding to the bear of the user equipment according to the second user plane configuration information further comprises: under a condition that the designated bearer is configured with EHC information and RoHC information simultaneously, the CU-UP compresses the data packets in an EHC mode in the uplink direction and the downlink direction.

FIG. 2 is a schematic structural diagram of a base station according to one embodiment of the present disclosure. As shown in FIG. 2, the base station includes a memory 21 and a processor 22.

The memory 21 is used for storing instructions, and the processor 22 is coupled to the memory 21. The processor 22 is configured to execute the method according to any of the embodiments in FIG. 1 based on the instructions stored in the memory.

As shown in FIG. 2, the base station further includes a communication interface 23 for exchanging information with other devices. Meanwhile, the device also includes a bus 24, and the processor 22, the communication interface 23 and the memory 21 are communicated with each other through the bus 24.

The memory 21 may comprise high-speed RAM memory, and may also include non-volatile memory, such as at least one disk memory. The memory 21 may also be a memory array. The storage 21 may also be partitioned into blocks which may be combined into virtual volumes according to certain rules.

Further, the processor 22 may be a central processing unit CPU, or may be an application specific integrated circuit ASIC, or one or more integrated circuits configured to implement embodiments of the present disclosure.

The present disclosure also relates to a non-transitory computer-readable storage medium, in which computer instructions are stored, and when executed by a processor, the instructions implement the method according to any one of the embodiments in FIG. 1.

The present disclosure will be described in detail by the following specific embodiments.

Embodiment One

Figure 3:
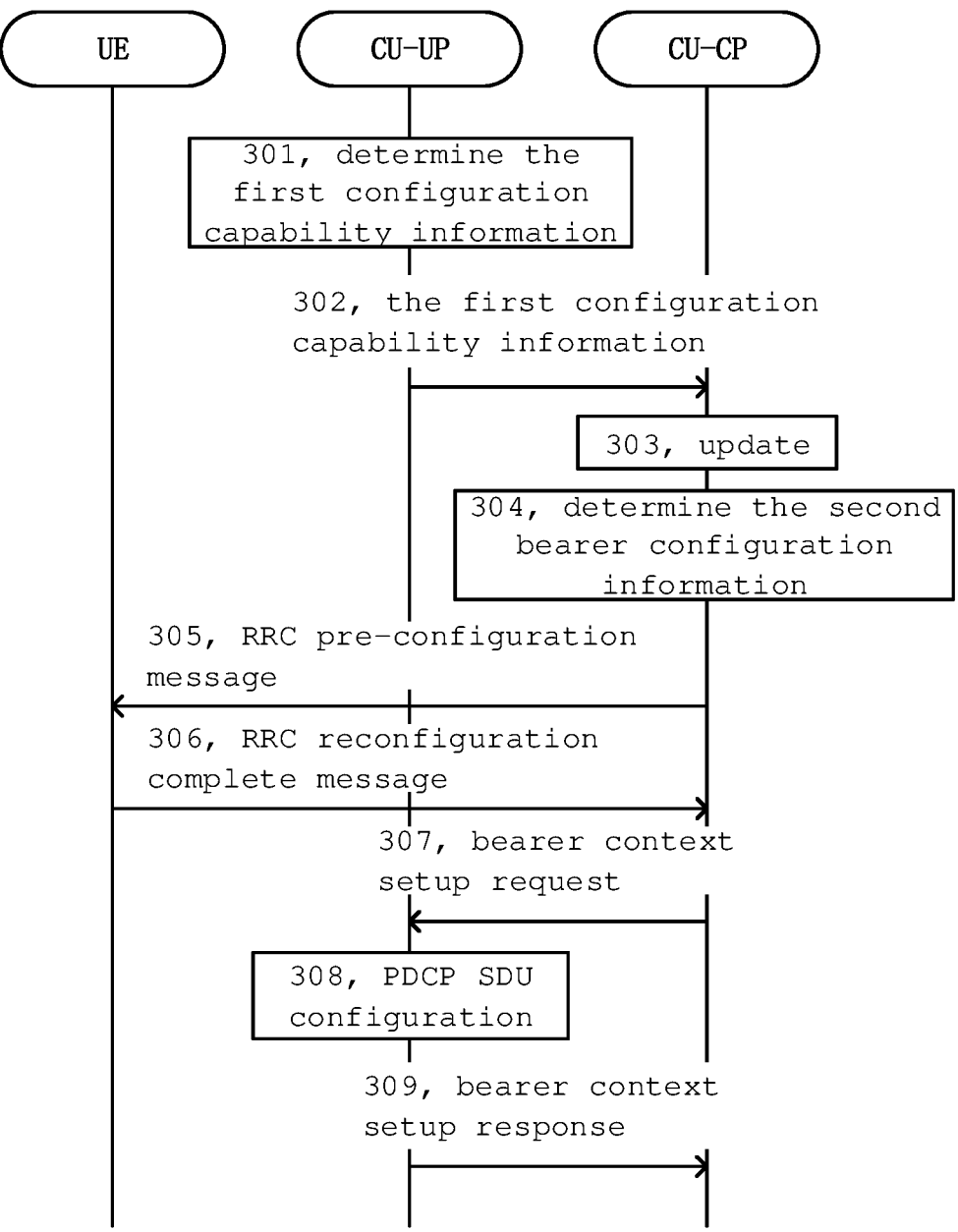
FIG. 3 is a schematic flow diagram of a user plane data processing method according to another embodiment of the disclosure.

The base station adopts a structure that CP and UPs are separated. The embodiment describes a process that the CU-UP sends its configuration capability to the CU-CP in the initial configuration process, and the CU-CP configures the AM mode to adopt a status report in bearer setup process of the user equipment. The user equipment is only configured with a default bearer and a dedicated DRB bearer and adopts the AM mode. This embodiment is illustrated by FIG. 3.

In step 301, the CU-UP determines the first configuration capability information of the CU-UP according to an interface setup request (gNB-CU-UP E1 Setup Request) sent by the CU-UP triggered by a network administrator, wherein the first configuration capability information includes, but is not limited to:

supporting RoHC capability: supporting bi-directional compression, and a list of supported compression algorithms supporting EHC capability: a maximum number of supported Context IDs, compression algorithms and a feedback mode, etc.

In step 302, the CU-UP determines a bearer message carrying the first configuration capability information according to the interface setup request message, and sends the bearer message to the CU-CP through the E1 interface.

In step 303, the CU-CP stores and updates the first configuration capability information corresponding to the CU-UP after receiving the message sent by the CU-UP.

In step 304, when determining that all bearers of the user equipment are configured according to the bearer setup request message sent by the core network, the CU-UP determines the second bearer configuration information of the service bearers of the user equipment carried by the CU-UP according to the bearer information of the user equipment and the first configuration capabilities of the plurality of CU-Ups. The second bearer configuration information comprises the following information:

bearer identifier: PDU Session ID

QoS configuration of bearers: when the PDU session ID is adopted for the bearer identifier, the QoS Flow Identifier, QoS Flow Level QoS Parameters and QoS Flow Mapping Indication defined in TS38.463 are included.

In step 305, the CU-CP determines the PDCP configuration information of each bearer according to the pre-configuration information and the fact that the user equipment has only two bearers, and sends protocol stack parameter configuration information including the PDCP configuration information to the user equipment through an RRC reconfiguration message. Since the dedicated bearer needs to ensure reliability, the AM mode is adopted, and it is determined that the user equipment has a need of handover according to the handover record information, such that the dedicated bearer adopts the AM mode and the status report needs to be configured.

In step 306, after receiving the RRC reconfiguration complete message fed back by the user equipment and confirming that the configuration has been validated, the CU-CP determines to send a Bearer Context Setup Request message containing the third configuration information to the CU-UP according to the second trigger information and sends the message. The third configuration information is contained in the PDCP configuration information, and includes:

a status report activation indication: is "true".

In step 307, the CU-UP uses the third configuration information for PDCP data transmission of the corresponding bearer in the user equipment after receiving the bearer context setup request message.

In step 308, the status report activation indication of the dedicated bearer is "true", the CU-UP needs to confirm the discard of PDCP SDU based on status report from the user equipment and discard timer, and determine that the PDCP SDU transmission is successful and deleted the PDCP SDU from the buffer based on the acknowledgement indication information of the PDCP PDU transmitted by the CU-CP.

In step 309, under a condition that the CU-UP indicates the bearer to trigger PDCP Re-establishment or PDCP Data Recovery IE in a configuration message, because the status report is triggered at the same time, the CU-UP confirms which PDCP SDUs need to be retransmitted and which PDCP SDUs have been correctly received based on the acknowledgement information of the status report, and generates information of a Receive Status of PDCP SDU, and notifies the CU-CP bearer configuration and data forwarding information through a Bearer Context Setup Response message or a Bearer Context Modification Response message.

Embodiment Two

Figure 4:
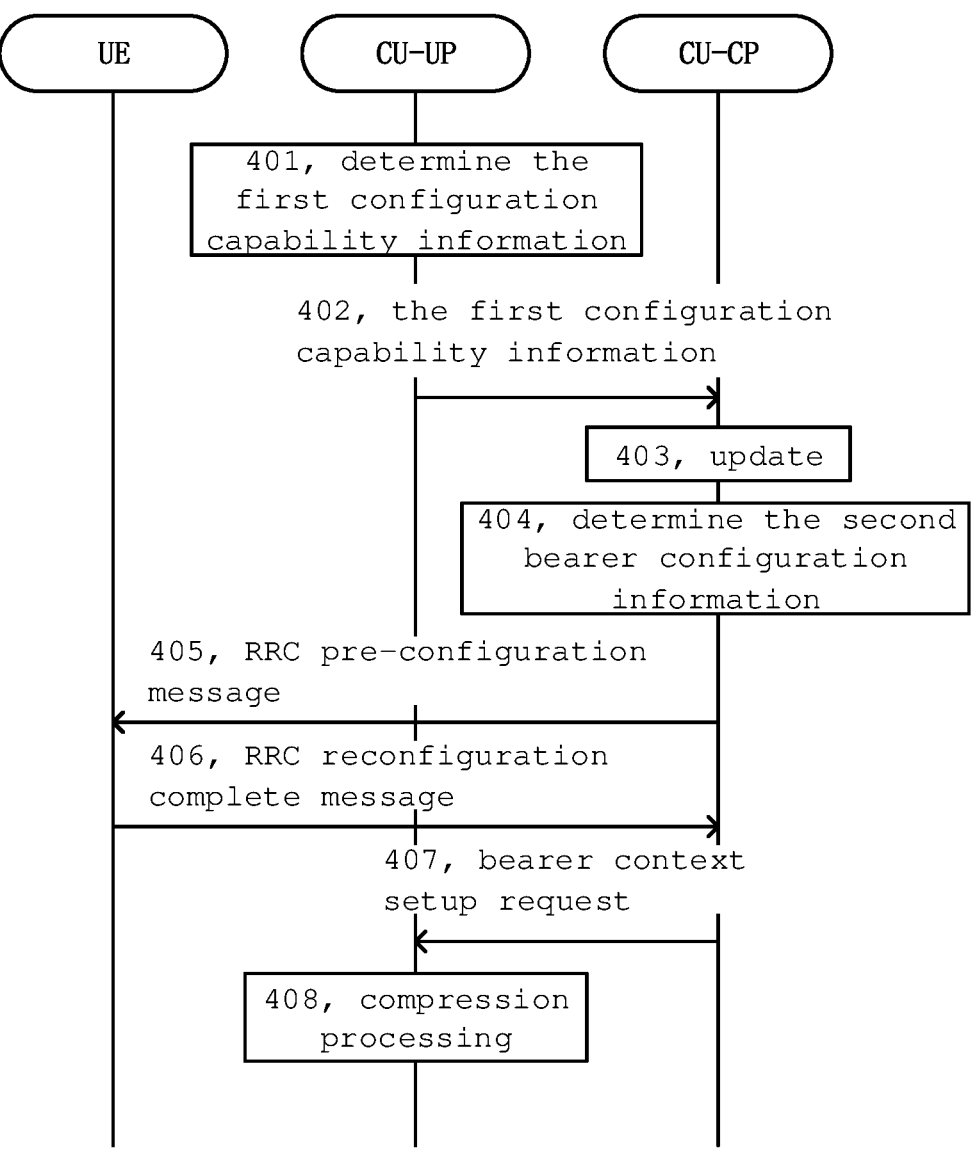
FIG. 4 is a schematic flow diagram of a user plane data processing method according to still another embodiment of the disclosure.

The base station adopts a structure that CP and UPs are separated. The embodiment describes a process that the CU-UP sends the configuration capability to the CU-CP in the initial configuration process, and the CU-CP configures the AM mode not to adopt a status report in bearer setup process of the user equipment. The user equipment is only configured with a default bearer and a dedicated DRB bearer which is compressed using EHC. This embodiment is shown in FIG. 4.

In step 401, the CU-UP determines the first configuration capability information of the CU-UP according to an interface setup request (gNB-CU-UP E1 Setup Request) message sent by the CU-UP triggered by a network administrator. The first configuration capability information includes, but is not limited to:

supporting RoHC capability: supporting bi-directional compression, and a list of supported compression algorithms supporting EHC capability: a maximum number of supported Context IDs, compression algorithms and a feedback mode, etc.

In step 402, the CU-UP determines a bearer message carrying the first configuration capability information according to the interface setup request message, and sends the bearer message to the CU-CP through the E1 interface.

In step 403, the CU-CP stores and updates the first configuration capability information corresponding to the CU-UP after receiving the message sent by the CU-UP.

In step 404, when determining that all bearers of the user equipment are configured according to the bearer setup request message sent by the core network, the CU-UP determines the second bearer configuration information of the service bearers of the user equipment carried by the CU-UP according to the bearer information of the user equipment and the first configuration capabilities of a plurality of CU-UPs. The second bearer configuration information includes the following information:

bearer identifier: PDU Session ID

QoS configuration of bearers: when the PDU session ID is adopted for the bearer identifier, the QoS Flow Identifier, QoS Flow Level QoS Parameters and QoS Flow Mapping Indication defined in TS38.463 are included.

In step 405, the CU-CP determines the PDCP configuration information of each bearer according to the pre-configuration information and the fact that the user equipment has only two bearers, and sends protocol stack parameter configuration information including the PDCP configuration information to the user equipment through an RRC reconfiguration message. Since the dedicated bearer needs a service that requires to support low latency services and has a high requirement for latency index, the dedicated bearer adopts EHC and needs to support a feedback mode.

In step 406, after receiving the RRC reconfiguration complete message fed back by the user equipment and confirming that the configuration is valid, the CU-CP determines to send a bearer context setup request message containing third configuration information to the CU-UP according to the second trigger information and sends the message. The third configuration information is contained in the PDCP configuration information, and includes:

EHC configuration feedback mechanism: is "true"

EHC configuration information: max CID and Continue EHC comprised in the uplink and downlink directions, and Padding Removal which is effective for uplink and downlink.

In step 407, the CU-UP uses the third configuration information for PDCP data transmission of the corresponding bearer in the user equipment after receiving the bearer context setup request message.

In step 408, when the CU-UP checks that the dedicated bearer is configured with the EHC information and the EHC configuration feedback mechanism indicates "true", the gNB CU-UP sends the feedback acknowledgement information through the PDCP control PDU after receiving the uncompressed packets sent by the user equipment in the uplink direction. The CU-UP firstly sends an uncompressed packet in the downlink direction, and then sends the compressed data packet to the user equipment according to the EHC configuration information after receiving the acknowledgement of the PDCP control PDU fed back by the user equipment.

By implementing the solution of the present disclosure, the following advantageous effects can be obtained:

1) The solution of the present disclosure enables the base station control plane entity to know the service configuration capability supported by the base station user plane entity, thereby selecting an appropriate base station user plane entity according to the service requirement of the user equipment without the need of involving manual participation.

2) The solution of the present disclosure avoids the situation that the user plane entity and the user equipment have different understandings concerning whether to trigger a status report, thereby reducing the production of retransmission data and improving the efficiency of an air interface.

3) The solution of the present disclosure supports that different EHC compression and feedback modes are set for each bearer to meet the requirements of different services on compression efficiency and transmission efficiency.

4) The solution of the present disclosure has the advantages of small change to the user equipment, good backward compatibility and good deployment feasibility. The solution of the present disclosure makes enhancement based on the existing protocol, and does not introduce new protocol process, and thus is easy to implement.

In some embodiments, the functional modules may be implemented as a general purpose processor, a programmable logic controller (PLC), a digital signal processor (DSP), an application specific integrated circuit (ASIC), a field-programmable gate array (FPGA) or other programmable logic devices, discrete gate or transistor logic, discrete hardware components, or any suitable combination thereof for performing the functions described in the present disclosure.

So far, the embodiments of the present disclosure have been described in detail. Some details well known in the art are not described in order to avoid obscuring the concepts of the present disclosure. Those skilled in the art can fully appreciate how to implement the teachings disclosed herein, in view of the foregoing description.

Although some specific embodiments of the present disclosure have been described in detail by way of examples, it should be understood by those skilled in the art that the above examples are for illustration only and are not intended to limit the scope of the present disclosure. It will be understood by those skilled in the art that various changes may be made and equivalents may be substituted for elements thereof without departing from the scope and spirit of the present disclosure. The scope of the present disclosure is defined by the appended claims.

What is claimed is:

1. A processing method of user plane data by a base station, comprising:

determining, by each user plane entity of a centralized unit (CU-UP) of the base station, a current service support capabilities according to first trigger information;

sending, by the each CU-UP entity, the current service support capabilities to a control plane entity of a centralized unit (CU-CP) of the base station;

selecting, by the CU-CP entity, a corresponding CU-UP entity for each service bearer of the user equipment according to the current service support capabilities of the each CU-UP entity under a condition that at least part of service bearers of the user equipment needs to be configured or updated according to second trigger information; and sending, by the CU-CP entity, first user plane configuration information associated with the each service bearer to the user equipment and second user plane configuration information associated with the each service bearer to the each CU-UP entity, thereby the user equipment determining whether to configure a packet data convergence protocol (PDCP) status report according to the first user plane configuration information, and each CU-UP entity determining whether to process the PDCP status report from the user equipment according to the second user plane configuration information, wherein the sending, by the CU-CP entity, the first user plane configuration information to the user equipment comprising:

determining, by the CU-CP entity, PDCP configuration information of the each service bearer according to pre-configuration information and the service bearer information of the user equipment; and sending, by the CU-CP entity, the first user plane configuration information to the user equipment through a radio resource control reconfiguration message, wherein the first user plane configuration information comprises protocol stack parameter configuration information associated with the PDCP configuration information.

2. The processing method according to claim 1, wherein the first trigger information comprises:

a first trigger request sent by a network administrator for triggering the each CU-UP entity to send a first interface setup request to the CU-CP entity, or a second trigger request sent by the network administrator for triggering the each CU-UP entity to send a first configuration update request to the CU-CP entity, or a second interface setup request or a second configuration update request sent by the CU-CP entity.

3. The processing method according to claim 2, wherein the current service support capabilities of the each CU-UP entity includes at least one of robust header compression capability support information and Ethernet header compression capability support information, wherein the robust header compression capability support information comprises at least one of supported uplink unidirectional header compression and bidirectional compression, and a list of supported compression algorithms, and the Ethernet header compression capability support information comprises a maximum number of supported context identifiers, compression algorithms, and a feedback mode.

4. The processing method according to claim 3, wherein the sending, by the each CU-UP entity, the current service support capabilities to the CU-CP entity comprises:

determining, by the each CU-UP entity, a first bearer message according to the first trigger information;

sending, by the each CU-UP entity, the current service support capabilities to the CU-CP entity by using the first bearer message;

updating, by the CU-CP entity, the current service support capabilities of the each CU-UP entity after receiving the current service support capabilities sent by the each CU-UP entity, wherein the first bearer message is a first interface setup request under a condition that the first trigger information is the first trigger request;

the first bearer message is the second configuration update request under a condition that the first trigger information is the second trigger request;

the first bearer message is an interface setup response under a condition that the first trigger information is the second interface setup request; and the first bearer message is a configuration update request response under a condition that the first trigger information is the second configuration update request.

5. The processing method according to claim 1, wherein the second trigger information comprises at least one of:

a handover request associated with the user equipment sent by a neighboring base station, a bearer setup request or a bearer modification request sent by a core network, and that the user equipment needs to trigger a re-establishment as detected by the CU-CP entity.

6. The processing method according to claim 1, wherein the determining, by the CU-CP entity, the PDCP configuration information of the each service bearer comprises:

determining, by the CU-CP entity, that the PDCP configuration information is not configured with a PDCP status report under a condition that the service bearer needs to be configured with an acknowledged mode and the user equipment does not have handover demand;

determining, by the CU-CP entity, that the PDCP configuration information is configured with a PDCP status report under a condition that the service bearer needs to be configured with an acknowledged mode and the user equipment has a handover demand; and determining, by the CU-CP entity, whether to configure at least one of a robust header compression mode and an Ethernet header compression mode in the PDCP configuration information according to the pre-configuration information under a condition that the service bearer does not need to configured with a acknowledged mode.

7. The processing method according to claim 1, wherein the pre-configuration information comprises at least one of: a service type of configuring a robust header compression, a service type of configuring a Ethernet header compression, a service type of simultaneously activating the Ethernet header compression and the robust header compression, and information about whether to trigger the status report.

8. The processing method according to claim 1, wherein the sending, by the CU-CP entity, the second user plane configuration information to the each CU-UP entity comprises:

determining, by the CU-CP entity, a second bearer message according to the second trigger information after receiving a radio resource control reconfiguration completion message sent by the user equipment;

sending, by the CU-CP entity, the second user plane configuration information to the each CU-UP entity using the second bearer message, wherein the second user plane configuration information comprises at least one of a activation indication of the PDCP status report, the robust header compression configuration information, an Ethernet header compression configuration feedback mechanism information and the Ethernet header compression configuration information;

processing, by the each CU-UP entity, PDCP data corresponding to a bearer of the user equipment according to the second user plane configuration information after receiving the second user plane configuration information sent by the control plane entity, wherein the second bearer message is a bearer context setup request under a condition that the second trigger information is a bearer setup request sent by a core network or a handover request sent by a neighboring base station; and the second bearer message is a bearer context modification request under a condition that the second trigger information is a bearer modification request sent by the core network.

9. The processing method according to claim 8, wherein the processing, by the each CU-UP entity, PDCP data corresponding to a bearer of the user equipment according to the second user plane configuration information comprises:

no processing, by the each CU-UP entity, the PDCP status report of the user equipment and discarding a PDCP service data unit according to a discard timer under a condition that the activation indication of the status report of a designated bearer is false or not configured, and deleting the PDCP service data unit from a buffer under a condition that the transmission of the PDCP service data unit is confirmed to be successful according to acknowledgement indication information of the PDCP protocol data unit sent by the CU-CP entity.

10. The processing method according to claim 9, wherein the processing, by the each CU-UP entity, the PDCP data corresponding to the bearer of the user equipment according to the second user plane configuration information comprises:

determining, by the each CU-UP entity, whether to discard the PDCP service data unit according to the PDCP status report of the user equipment and the discard timer under a condition that the activation indication of the status report of the designated bearer is true, and deleting the PDCP service data unit from a buffer under a condition that the transmission of the PDCP service data unit is confirmed to be successful according to acknowledgement indication information of the PDCP protocol data unit sent by the CU-CP entity.

11. The processing method according to claim 8, wherein the processing, by the each CU-UP entity, the PDCP data corresponding to the bearer of the user equipment according to the second user plane configuration information further comprises:

determining, by the each CU-UP entity, a PDCP service data unit to be retransmitted and a PDCP service data unit which has been correctly received according to whether a PDCP status report is triggered, generating reception status information of the PDCP service data unit, and sending the bearer configuration and data forwarding information to the CU-CP entity through third bearer information corresponding to the second bearer information, under a condition that the second user plane configuration information indicates that the designated bearer triggers a PDCP re-establishment or a PDCP data recovery information unit.

12. The processing method as claimed in claim 11, wherein the third bearer information is a bearer context setup response under a condition that the second bearer information is a bearer context setup request; and the third bearer message is a bearer context modification response under a condition that the second bearer information is a bearer context modification request.

13. The processing method according to claim 12, wherein the processing, by the each CU-UP entity, the PDCP data corresponding to the bearer of the user equipment according to the second user plane configuration information further comprises:

continuously sending, by the each CU-UP entity, a preset number of uncompressed data packets firstly and then sending subsequent data in a compression mode in a process of performing data processing in the downlink direction, under a condition that the designated bearer is configured with Ethernet header compression information but is not configured with Ethernet header compression feedback mechanism, or under a condition that the designated bearer is configured with Ethernet header compression information and the Ethernet header compression feedback mechanism information indicates false.

14. The processing method according to claim 13, wherein the processing, by the each CU-UP entity, the PDCP data corresponding to the bearer of the user equipment according to the second user plane configuration information further comprises:

sending, by the each CU-UP entity, feedback acknowledgement information through the PDCP control protocol data unit in a case where uncompressed data packets sent by the user equipment are received in the process of performing compression in the uplink direction, under a condition that the designated bearer is configured with Ethernet header compression information and the Ethernet header compression feedback mechanism information indicates true.

15. The processing method according to claim 14, wherein the processing, by the each CU-UP entity, the PDCP data corresponding to the bearer of the user equipment according to the second user plane configuration information further comprises:

sending, by the each CU-UP entity, a preset number of uncompressed data packets firstly, and then sending compressed data packets to the user equipment according to the Ethernet header compression configuration information after receiving acknowledgement information of the PDCP control protocol data unit fed back by the user equipment in the process of performing data processing in the downlink direction, under a condition that the designated bearer is configured with the Ethernet header compression information and the Ethernet packet header compression feedback mechanism information indicates true.

16. The processing method according to claim 8, wherein the processing, by the each CU-UP entity, the PDCP data corresponding to the bearer of the user equipment according to the second user plane configuration information further comprises:

feedbacking, by the each CU-UP entity, compression mode indication information not through the PDCP control protocol data unit in a case where uncompressed data packets sent by the user equipment are received in the process of performing compression in the uplink direction, under a condition that the designated bearer is configured with the Ethernet header compression information but is not configured with the Ethernet header compression feedback mechanism, or under a condition that the designated bearer is configured with the Ethernet header compression information and the Ethernet header compression feedback mechanism information indicates false.

17. The processing method according to claim 8, wherein the processing, by the each CU-UP entity, the PDCP data corresponding to the bearer of the user equipment according to the second user plane configuration information further comprises:

compressing, by the each CU-UP entity, data packets in an Ethernet header compression mode in the uplink direction and the downlink direction under a condition that the designated bearer is configured with Ethernet header compression information and robust header compression information simultaneously.

18. A base station, comprising:

a processor; and a memory coupled to the processor, storing program instructions which, when executed by the processor, cause the processor to:

determine, by each user plane entity of a centralized unit (CU-UP) of the base station, a current service support capabilities according to first trigger information;

send, by the each CU-UP entity, the current service support capabilities to a control plane entity of a centralized unit (CU-CP) of the base station;

select, by the CU-CP entity, a corresponding CU-UP entity for each service bearer of the user equipment according to the current service support capabilities of the each CU-UP entity under a condition that at least part of service bearers of the user equipment needs to be configured or updated according to second trigger information; and send, by the CU-CP entity, first user plane configuration information associated with the each service bearer to the user equipment and second user plane configuration information associated with the each service bearer to the each CU-UP entity, thereby the user equipment determining whether to configure a packet data convergence protocol (PDCP) status report according to the first user plane configuration information, and each CU-UP entity determining whether to process the PDCP status report from the user equipment according to the second user plane configuration information, wherein the send, by the CU-CP entity, the first user plane configuration information to the user equipment comprising:

determine, by the CU-CP entity, PDCP configuration information of the each service bearer according to pre-configuration information and the service bearer information of the user equipment; and send, by the CU-CP entity, the first user plane configuration information to the user equipment through a radio resource control reconfiguration message, wherein the first user plane configuration information comprises protocol stack parameter configuration information associated with the PDCP configuration information.

19. A non-transitory computer readable storage medium for storing computer instructions which, when executed by a processor, cause the processor to:

determine, by each user plane entity of a centralized unit (CU-UP) of the base station, a current service support capabilities according to first trigger information;

send, by the each CU-UP entity, the current service support capabilities to a control plane entity of a centralized unit (CU-CP) of the base station;

select, by the CU-CP entity, a corresponding CU-UP entity for each service bearer of the user equipment according to the current service support capabilities of the each CU-UP entity under a condition that at least part of service bearers of the user equipment needs to be configured or updated according to second trigger information; and send, by the CU-CP entity, first user plane configuration information associated with the each service bearer to the user equipment and second user plane configuration information associated with the each service bearer to the each CU-UP entity, thereby the user equipment determining whether to configure a packet data convergence protocol (PDCP) status report according to the first user plane configuration information, and each CU-UP entity determining whether to process the PDCP status report from the user equipment according to the second user plane configuration information, wherein the send, by the CU-CP entity, the first user plane configuration information to the user equipment comprising:

determine, by the CU-CP entity, PDCP configuration information of the each service bearer according to pre-configuration information and the service bearer information of the user equipment; and send, by the CU-CP entity, the first user plane configuration information to the user equipment through a radio resource control reconfiguration message, wherein the first user plane configuration information comprises protocol stack parameter configuration information associated with the PDCP configuration information.

* * * * *